United States Patent
Peng et al.

(10) Patent No.: US 11,919,247 B2
(45) Date of Patent: Mar. 5, 2024

(54) POWDER-BASED THREE-DIMENSIONAL PRINTING (3DP) METHOD, DEVICE AND SYSTEM, AND COMPUTER-READABLE STORAGE MEDIUM

(71) Applicant: KOCEL INTELLIGENT MACHINERY LIMITED, Yinchuan (CN)

(72) Inventors: Fan Peng, Yinchuan (CN); Donge Zheng, Yinchuan (CN); Yinxue Du, Yinchuan (CN); Yi Liu, Yinchuan (CN); Jun Yang, Yinchuan (CN); Cheng Hu, Yinchuan (CN); Zixiang Zhou, Yinchuan (CN)

(73) Assignee: KOCEL INTELLIGENT MACHINERY LIMITED, Yinchuan (CN)

( * ) Notice: Subject to any disclaimer, the term of this patent is extended or adjusted under 35 U.S.C. 154(b) by 322 days.

(21) Appl. No.: 17/555,481

(22) Filed: Dec. 19, 2021

(65) Prior Publication Data
US 2022/0111600 A1    Apr. 14, 2022

Related U.S. Application Data

(63) Continuation of application No. PCT/CN2020/097337, filed on Jun. 22, 2020.

(30) Foreign Application Priority Data

Jun. 27, 2019   (CN) .......................... 201910568261.6

(51) Int. Cl.
   *B29C 67/00*   (2017.01)
   *B29C 64/153*  (2017.01)
   (Continued)

(52) U.S. Cl.
   CPC .......... *B29C 64/393* (2017.08); *B29C 64/153* (2017.08); *B33Y 10/00* (2014.12); *B33Y 30/00* (2014.12); *B33Y 50/02* (2014.12)

(58) Field of Classification Search
   CPC ..... B29C 64/153; B29C 64/393; B33Y 10/00; B33Y 30/00; B33Y 50/02
   See application file for complete search history.

(56) References Cited

U.S. PATENT DOCUMENTS

2017/0014907 A1   1/2017   Ng et al.
2018/0133983 A1   5/2018   Chen

FOREIGN PATENT DOCUMENTS

CA      3046155 A     6/2018
CN    205148936 A     4/2016
(Continued)

*Primary Examiner* — Ryan M Ochylski

(57) ABSTRACT

A powder-based three-dimensional printing (3DP) method, device and system, and a computer-readable storage medium. The method includes: analyzing printing images of layers corresponding to a part to be printed to determine a target print image and adding a preset mark to the target print image which includes a print image of a target layer that causes a previous powder layer of the target layer to displace during printing; acquiring an image to be printed of a current layer to be printed; identifying the image to be printed to determine whether the preset mark exists on the image to be printed; and if yes, processing the current layer to be printed and/or a previous powder layer of the current layer to be printed such that the previous powder layer of the current layer does not move with powder spreading of the current layer.

11 Claims, 3 Drawing Sheets

(51) Int. Cl.
*B29C 64/393* (2017.01)
*B33Y 10/00* (2015.01)
*B33Y 30/00* (2015.01)
*B33Y 50/02* (2015.01)

(56) References Cited

FOREIGN PATENT DOCUMENTS

| | | | | |
|---|---|---|---|---|
| CN | 105834422 A | 8/2016 | | |
| CN | 107433714 A | 12/2017 | | |
| CN | 107599380 A | 1/2018 | | |
| CN | 107718530 A | 2/2018 | | |
| CN | 108081588 A | * 5/2018 | ............. | B33Y 30/00 |
| CN | 108139665 A | 6/2018 | | |
| CN | 109304872 A | 2/2019 | | |
| WO | WO-2018024210 A1 | * 2/2018 | ............. | B22F 10/00 |
| WO | 2018064892 A1 | 4/2018 | | |

* cited by examiner

POWDER-BASED THREE-DIMENSIONAL PRINTING (3DP) METHOD, DEVICE AND SYSTEM, AND COMPUTER-READABLE STORAGE MEDIUM

CROSS-REFERENCE TO RELATED APPLICATIONS

This application is a continuation of International Patent Application No. PCT/CN2020/097337, filed on Jun. 22, 2020, which claims the benefit of priority from Chinese Patent Application No. 201910568261.6, filed on Jun. 27, 2019. The content of the aforementioned application, including any intervening amendments thereto, is incorporated herein by reference in its entirety.

TECHNICAL FIELD

This application relates to three-dimensional printing (3DP), and more particularly to a powder-based 3DP method, device and system, and a computer-readable storage medium.

BACKGROUND

In the powder-based three-dimensional printing (3DP) process, powder materials are laid layer by layer, and then a binding agent is selectively sprayed onto part of the powder layers such that this part is bonded and solidified to prepare a desired part. During the printing process, a layer of powder is spread evenly, and then a layer of a binding agent is sprayed on an area to be formed. Since the binding agent droplets are small and not easy to disperse, the powder in contact with the binding agent will be solidified quickly via a chemical reaction, while the powder area without being exposed to the binding agent remains loose. Through the alternate overlaying of the powder layer and the binding agent layer, a desired part is printed and formed. After the printing is completed, it is only required to remove the loose powder.

In order to enable the high-efficiency 3DP, the spreading area of the binding agent on the powder layer generally reaches 2200 mm*1800 mm, and the spreading speed of the powder reaches 300-330 mm/s. Due to the relatively high powder-spreading speed, if the first layer of powder is not completely solidified after the reaction with the binding agent, the first layer of powder sprayed with a larger area of the binding agent will be pushed to move when the second layer of powder is laid, which will seriously affect the printing effect. Thus, in the actual printing, the working box needs to be stopped manually after the first layer is printed, and then started manually. Moreover, the middle layer can only be used to print models with a small area difference product between adjacent layers. Therefore, in the existing 3D printing technology, the flexibility of the equipment and the space utilization of the working box are greatly limited, which further affects the printing efficiency.

SUMMARY

An object of the present disclosure is to provide a powder-based three-dimensional printing (3DP) method, device and system, and a computer-readable storage medium, which can avoid the occurrence of powder displacement to a certain extent, and are beneficial to improving the printing efficiency and the quality of printed products.

Technical solutions of the present disclosure are described as follows.

In a first aspect, the present disclosure provides a powder-based 3DP method of printing, comprising:
analyzing print images of individual layers corresponding to a part to be printed to determine a target print image; and adding a preset mark to the target print image; wherein the target print image comprises a print image of a target layer which causes a previous layer of powder to be pushed and displaced during printing;
acquiring an image to be printed of a current layer to be printed; and
identifying the image to be printed to determine whether the preset mark exists on the image to be printed; and if the preset mark exists on the image to be printed, processing the current layer to be printed and/or a previous layer of powder of the current layer to be printed such that the previous layer of powder of the current layer to be printed does not move along with powder spreading of the current layer to be printed.

In some embodiments, the step of "analyzing print images of individual layers corresponding to a part to be printed to determine a target print image; and adding a preset mark to the target print image" is performed through steps of:
performing difference-product processing on spraying areas of a binder in print images of adjacent two layers in the layers corresponding to the part to be printed;
calculating a difference-product image area between a spraying area of the binder in a print image of an $(n+1)^{th}$ layer and a spraying area of the binder in a print image of an $n^{th}$ layer, wherein n=1, 2, 3 . . . N, and N is the total number of print images; and determining whether the difference-product image area is greater than a preset value; if yes, taking the print image of the $(n+1)^{th}$ layer as the target print image, and adding the preset mark to the print image of the $(n+1)^{th}$ layer.

In some embodiments, the step "the step of "processing the current layer to be printed and/or a previous layer of powder of the current layer to be printed" is performed through steps of:
reducing a spreading speed of a powder spreader on the current layer to be printed; and/or
solidifying the previous layer of powder of the current layer to be printed.

In some embodiments, the step of "processing the current layer to be printed and/or a previous layer of powder of the current layer to be printed" is performed through steps of:
controlling a powder spreader to pause for a preset time period, and subsequently spreading powder on the current layer to be printed; and/or
solidifying the pervious layer powder of the current layer to be printed.

In some embodiments, the step the step of "solidifying the previous layer of powder of the current layer to be printed" is performed through a step of:
adding a catalyst to the previous layer of powder of the current layer to be printed to solidify the previous layer of powder.

In a second aspect, the present disclosure provides a powder-based 3DP device, comprising:
an adding module;
an acquisition module;
a recognition module; and
a processing module;
wherein the adding module is configured to analyze print images of individual layers corresponding to a part to be printed to determine a target print image and add a preset mark to the target print image; and the target print image comprises a print image of a target layer, which causes a previous layer of powder to be pushed and displaced during printing;

the acquisition module is configured to acquire an image to be printed of a current layer to be printed;

the recognition module is configured to identify the image to be printed to determine whether the preset mark exists on the image to be printed, and trigger the processing module if the preset mark exists on the image to be printed; and the processing module is configured to process the current layer to be printed and/or a previous layer of powder of the current layer to be printed such that the previous layer of powder does not move along with powder spreading of the current layer to be printed.

In some embodiments, the adding module comprises:
a processing unit;
a judgment unit; and
an adding unit;
wherein the processing unit is configured to perform difference-product processing on spraying areas of a binder in print images of adjacent two layers in the layers corresponding to the part to be printed, and calculate a difference-product image area between a spraying area of the binder in a print image of an $(n+1)^{th}$ layer and a spraying area of the binder in a print image of an $n^{th}$ layer, wherein n=1, 2, 3 . . . N, and N is the total number of print images; and the judgment unit is configured to determine whether the difference-product image area is greater than a preset value, and trigger the adding unit if the difference-product image area is greater than the preset value; and the adding unit is configured to take the print image of the $(n+1)^{th}$ layer as the target print image and add the preset mark to the print image of the $(n+1)^{th}$ layer.

In some embodiments, the processing unit comprises:
a pause unit configured to control a powder spreader to pause for a preset time period and subsequently spread powder on the current layer to be printed; and/or
a solidifying unit configured to solidify the previous layer of powder of the current layer to be printed.

In a third aspect, the present disclosure provides a powder-based 3DP system, comprising:
a memory configured to store a computer program; and
a processor configured to execute the computer program to implement the powder-based 3DP method.

In a fourth aspect, the present disclosure provides a computer-readable storage medium, wherein the computer readable storage medium stores the computer programs; and the computer programs is executed by the processor to implement the steps in the above-mentioned method.

Compared to the prior art, the present disclosure has the following

In the powder-based 3DP method provided herein, a target print image that needs to be added with a preset mark is determined by pre-analyzing the print images of individual layers corresponding to a part to be printed, and the preset mark is added to the target print image, where the target print image includes a print image of a target layer that causes the previous powder layer to displace during the printing. Then a print image of a current layer is recognized, and when there is a preset mark on the print image of the current print layer, the current layer to be printed and/or a previous powder layer of the current layer to be printed are/is processed such that the previous powder layer does not move along with the powder spreading of the current layer to be printed, avoiding the occurrence of powder displacement to a certain extent, and facilitating improving the printing efficiency and quality of printed products.

BRIEF DESCRIPTION OF THE DRAWINGS

To explain the technical solutions in the embodiments of the present disclosure more clearly, the drawings needed in the prior art and the embodiments of the disclosure will be briefly introduced below. Obviously, presented in the drawings are only some embodiments of the present disclosure. For those skilled in the art, other drawings can be obtained based on the drawings provided herein without paying any creative effort.

DETAILED DESCRIPTION OF EMBODIMENTS

Provided herein are a powder-based 3DP printing method, device and system, and a computer-readable storage medium, which can avoid the occurrence of powder displacement to a certain extent during the printing, and is beneficial to improving the printing efficiency and the quality of printed products.

To make the object, technical solutions, and beneficial effects clearer, the disclosure will be described in detail below with reference to accompanying drawings and the embodiments. It should be noted that the embodiments are merely some embodiments of the present disclosure, and are not intended to limit the disclosure. It should be understood that other embodiments obtained by those skilled in the art based on the content disclosed herein without paying any creative effort shall fall within the protection scope of the present disclosure.

Figure 1:
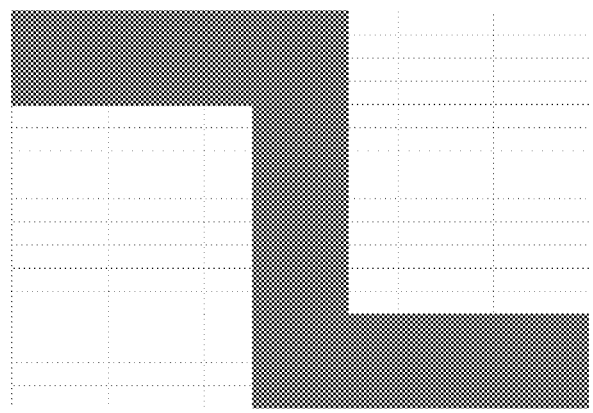
FIG. 1 is a schematic diagram of an existing component printing model.

Referring to FIG. 1, a component printing model in the prior art is illustrated, where the powder sprayed with the binding agent on the first powder layer and the powder sprayed with the binding agent on the 14th powder layer are displaced respectively when laying the second layer of powder and the 15th layer of powder. It has been found that after spraying the binding agent and before laying the next layer of powder, half a minute should be taken to allow the powder to be sufficiently solidified, avoiding the displacement of powder.

Figure 2:
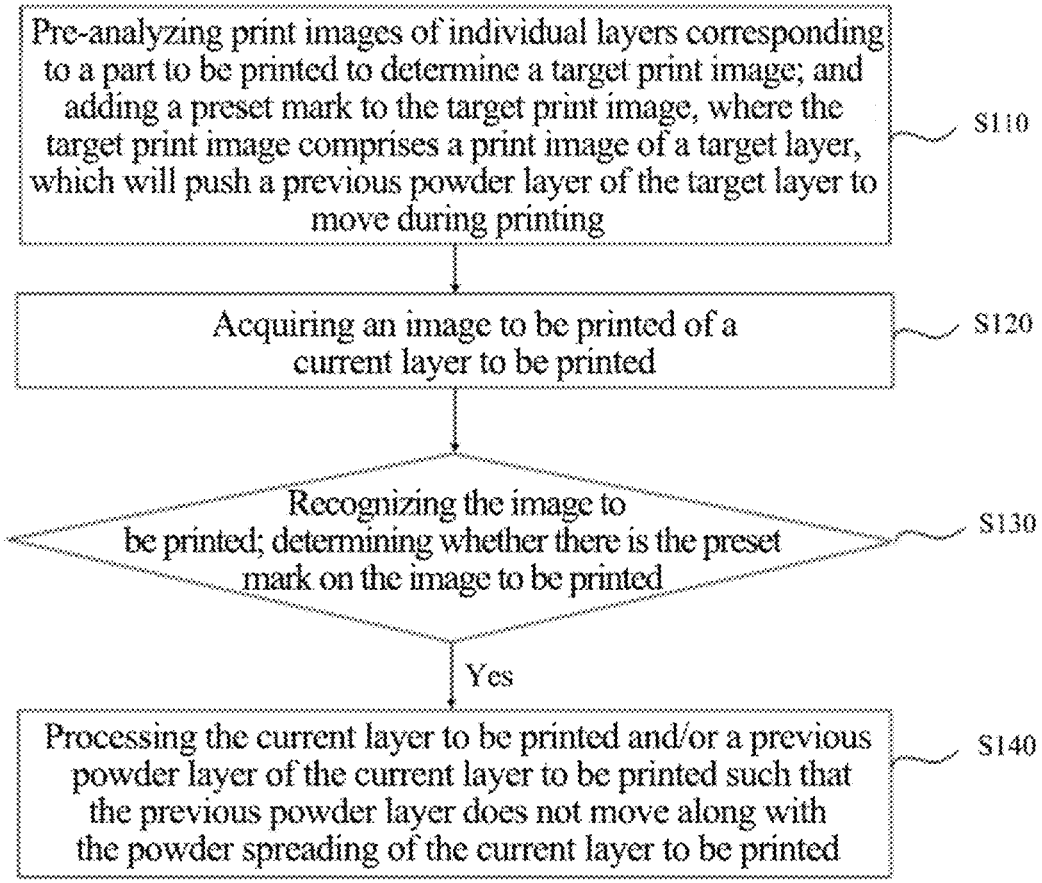
FIG. 2 is a flow chart of a powder-based 3DP method according to an embodiment of the present disclosure.

Referring to FIG. 2, a powder-based 3DP method is illustrated, which includes the following steps.

(S110) Print images of individual layers corresponding to a part to be printed are pre-analyzed to determine a target print image, and then the target print image is added with a preset mark, where the target print image includes a print image of a target layer, which will push a previous layer of powder of the target layer to move during printing.

It should be noted that each part to be printed corresponds to its own multi-layer print image. When the part to be printed is created, the print images are sequentially read to print the corresponding layer. In this application, the print images of individual layers corresponding to the part to be printed are analyzed in advance to determine a target layer that will displace the previous layer of powder of the target layer during the printing, and a print image of the target layer is taken as the target print image. The target layer needs to be specially processed to prevent the displacement of the previous powder layer of the target layer during the printing. Therefore, in this application, after the target print image is determined, a preset mark (the preset mark is, for example, "1") is introduced to the target print image to facilitate identifying which layer will cause its previous powder layer to move during the printing, determining which layer needs to be processed. In this embodiment, the step (S110) only needs to be executed once before printing the part to be printed.

In an embodiment, the step (S110) is specifically performed as follows.

A difference-product processing is performed on spraying areas of a binder in print images of adjacent two layers in the layers corresponding to the part to be printed. A difference product image area between a spraying area of the binder in a print image of an $(n+1)^{th}$ layer and a print image of an $n^{th}$ layer is calculated, where n=1, 2, 3 . . . N, and N is the total number of print images.

Whether the difference-product image area is greater than the preset value is determined, and if yes, the print image of the $(n+1)^{th}$ layer is taken as the target print image and is added with the preset mark.

It should be noted that the spraying area in the print image refers to an area of a region in the print image needed to be sprayed with the binder, that is, the region is sprayed with the binder in the actual printing.

Figure 3:
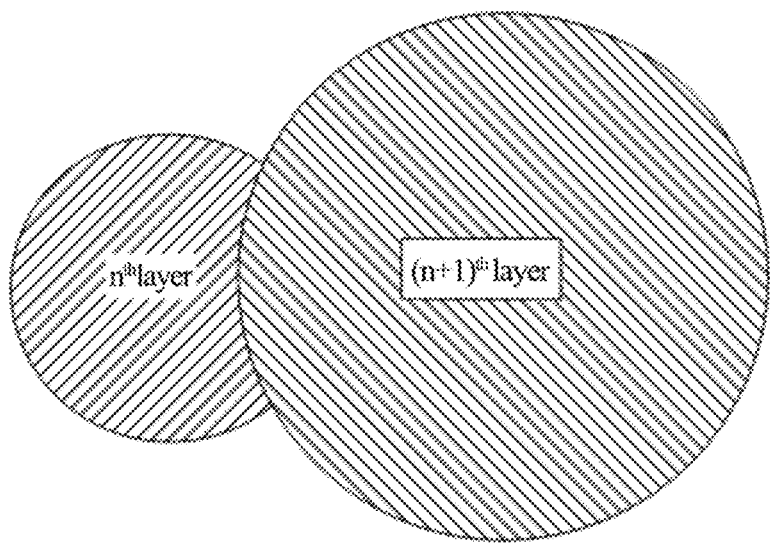
FIG. 3 schematically illustrates spraying areas of a binder in a print image of an $(n+1)^{th}$ layer and a print image of an $n^{th}$ layer according to an embodiment of the present disclosure.
Figure 4:
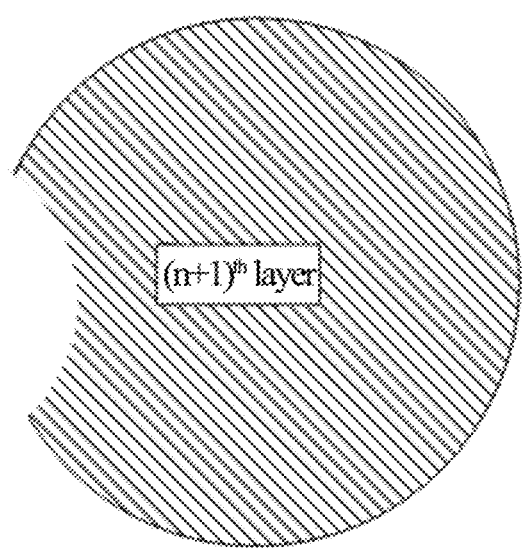
FIG. 4 schematically illustrates a difference-product image corresponding to FIG. 3.

In an embodiment, the spraying region in the print image of the $(n+1)^{th}$ layer and the spraying region in the print image of the $n^{th}$ layer are illustrated in FIG. 3. In this application, the difference-product image area between the spraying region in the print image of the $(n+1)^{th}$ layer and the print image of the $n^{th}$ layer is calculated and determined whether it is greater than the preset value (for example, the preset value is 0.5 m$^2$). When the difference-product image area is greater than the preset value, it means that the $n^{th}$ powder layer will be displaced when the $(n+1)^{th}$ layer is printed, so the print image of the $(n+1)^{th}$ layer is added with the preset mark. The polling is carried out from the first print image whose spraying area has a difference-product image area with respect to a spraying area of its previous print image greater than the preset value until the processing of the print image of the $N^{th}$ layer and the print image of the $(N-1)^{th}$ layer is completed. Target print images of individual parts to be printed are added with the preset mark in the above-mentioned manner.

(S120) An image to be printed of a current layer to be printed is acquired.

Specifically, the print images of individual layers are read sequentially, and each layer is printed according to the actual needs. When the current layer to be printed is printed, the print image of the current layer can be read from pre-stored print images of multiple layers corresponding to the part to be printed.

(S130) The image to be printed is identified to determine whether the preset mark exists on the image to be printed, and if yes, step (S140) is performed.

After an image to be printed of a current layer to be printed is acquired, the image to be printed is identified to determine whether a preset mark exists on the image to be printed. When there is a preset mark on the image to be print of the current layer to be print, if the current layer to be printed is printed in a conventional way, a previous powder layer of the current layer to be printed will be displaced, so step (S140) needs to be performed at this time such that the previous powder layer of the current layer to be printed does not move along with the powder spreading of the current layer to be printed after processing. When there is no a preset mark on the image to be printed, the current layer to be printed is printed in a conventional way, which will not cause the displacement of the previous powder layer of the current layer to be printed, so the current layer to be printed can be printed in a conventional way (for example, the speed of powder spreading is not less than 300 mm/s).

(S140) The current layer to be printed and/or a previous layer of powder of the current layer to be printed are/is processed such that the previous powder layer does not move along with powder spreading of the current layer to be printed.

In an embodiment, if the preset mark exists on the image to be printed, the current layer to be printed and/or a previous layer of powder of the current layer to be printed can be processed such that the previous layer of powder does not move along with powder spreading of the current layer to be printed. Subsequently, the current layer to be printed is printed. After the printing of the current layer to be printed is completed, a print image of a later layer to be printed can be acquired sequentially to determine whether a preset mark exists on the print image, and if yes, the print layer is processed according to the method provided in this application; otherwise, the print layer is printed according to a conventional printing method, where the conventional printing method is mature in the prior art and is not described in detail in this application.

In some embodiments, the step (S140) is performed as follows.

A powder spreading speed of a powder spreader on the current layer to be printed is reduced; and/or the previous powder layer of the current layer to be printed is subjected to solidifying.

It should be noted that the powder spreading speed can be reduced by controlling the powder spreader, for example, the powder spreading speed of the powder spreader is lower than 300 mm/s, so as to reduce the impact of the current layer to be printed on the previous powder layer and enable the previous powder layer to not move with powder spreading of the current layer to be printed. In addition, the previous powder layer can also be solidified, for example, by applying a catalyst to the previous powder layer such that the previous powder layer can be solidified faster and the strength of the previous powder layer can resist the impact from the current layer to be printed. It is also possible to solidify the previous powder layer while reducing the spreading speed of the powder spreader. The specific methods to be used can be determined according to actual needs, and are not specially restricted in this application.

It should also be noted that step (S140) can also be performed as follows.

The powder spreader is controlled to pause for a preset time period, and subsequently the current layer to be printed is spread with powder; and/or the previous powder layer of the current layer to be printed is solidified.

That is, it is also possible to control the powder spreader to pause for a preset time period (i.e., 1 min), so that the previous powder layer has a long enough time to be solidified to obtain the strength that can resist the impact from the current layer to be printed. In addition, to shorten the pause time period, the previous powder layer can be solidified while the powder spreader is paused such that the previous powder layer does not move with powder spreading of the current layer to be printed, improving printing efficiency.

In an embodiment, the previous powder layer of the current layer to be printed is solidified as follows.

The previous powder layer is added with a catalyst to be solidified.

In addition to applying a catalyst, the solidification of the previous powder layer can also be achieved in other ways, such as heating or cooling. The specific method can be selected based on actual needs.

It can be seen that, in the powder-based 3DP method provided herein, a target print image that needs to be added with a preset mark is determined by pre-analyzing the print images of individual layers corresponding to a part to be printed, and the preset mark is added to the target print image. The target print image includes a print image of a target layer that causes the previous powder layer to displace during the printing. Then a print image of a current layer is recognized, and when there is a preset mark on the print image of the current layer, the current layer to be printed and/or a previous powder layer of the current layer to be printed are/is processed such that the previous powder layer does not move along with the powder spreading of the current layer to be printed, avoiding the occurrence of powder displacement to a certain extent, and facilitating improving the printing efficiency and quality of printed products.

In addition, the powder-based 3DP method provided in this application does not need to limit the spraying area of the intermediate layer of a part to be printed, that is, the method can print a model with a large spraying area of the intermediate layer, expanding the scope of use.

Figure 5:
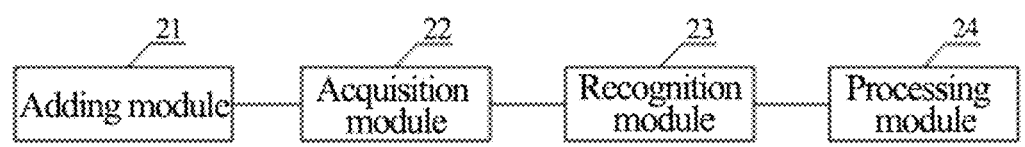
FIG. 5 schematically shows a powder-based 3DP device according to an embodiment of the present disclosure.

Based on the above-mentioned embodiment, the present disclosure also provides a 3DP powder printing device, referring to FIG. 5 for details. The device includes an adding module 21, an acquisition module 22, a recognition module 23 and a processing module 24. The adding module 21 is configured to analyze print images of individual layers corresponding to a part to be printed to determine a target print image and add a preset mark to the target print image. The target print image includes a print image of a target layer, which causes a previous layer of powder to be pushed and displaced during printing during the printing. The acquisition module 22 is configured to acquire an image to be printed of a current layer to be printed. The recognition module 23 is configured to identify the image to be printed to determine whether the preset mark exists on the image to be printed, and trigger the processing module if the preset mark exists on the image to be printed. The processing module 24 is configured to process the current layer to be printed and/or a previous layer of powder of the current layer to be printed such that the previous powder layer does not move along with powder spreading of the current layer to be printed.

In some embodiments, the adding module 21 includes a processing unit, a judgment unit and an adding unit. The processing unit is configured to perform difference-product processing on spraying areas of a binder in print images of in adjacent two layers in the layers corresponding to the part to be printed, and calculate a difference-product image area between a spraying area of the binder in a print image of an $(n+1)^{th}$ layer and a spraying area of the binder in a print image of an $n^{th}$ layer, where n=1, 2, 3 . . . N, and N is the total number of print images. The judgment unit is configured to determine whether difference-product image area is greater than a preset value, and trigger the adding unit if the difference-product image area is greater than the preset value. The adding unit is configured to take the print image of the $(n+1)^{th}$ layer as the target print image and add the preset mark to the print image of the $(n+1)^{th}$ layer.

In some embodiments, the processing unit includes a pause unit and a solidifying unit. The pause unit is configured to control a powder spreader to pause for a preset time period and subsequently spread powder on the current layer to be printed. And/or the solidifying unit is configured to solidify the previous layer of powder of the current layer to be printed.

It should be noted that the powder-based 3DP device provided in this embodiment has the same beneficial effects as the powder-based 3DP method illustrated above (referring to the above-mentioned embodiments for the specific implementation of the powder-based 3DP method).

Based on the above-mentioned embodiments, the present disclosure further provides a powder-based 3DP system. The system includes a memory and a processor. The memory is configured to store a computer program, and the processor is configured to execute the computer program to implement the above powder-based 3DP method.

For example, the processor of this embodiment is configured to pre-analyze print images of individual layers corresponding to a part to be printed to determine a target print image that needs to be added with a preset mark, and the preset mark is added to the target print image. The target print image includes a print image of a target layer that causes the previous powder layer to displace during the printing. The processor is also configured to acquire a image to be printed of a current layer to be printed, and recognize the image to be printed to determine whether there is a preset mark on the pattern to be printed, and if yes, the current layer to be printed and/or the previous powder layer of the current layer to be printed are/is processed such that the previous powder layer does not move along with the powder spreading of the current layer to be printed.

Based on the above-mentioned, a computer-readable storage medium is also provided in an embodiment of the present disclosure. The computer-readable storage medium stores a computer program. The computer program is executed by the processor to implement the powder-based 3DP method provided in the present disclosure.

The computer-readable storage medium can be a U disk, a portable hard drive, a read-only memory (ROM), a random access memory (RAM), a magnetic disk or a compact disk which can store program codes.

The embodiments are described in a progressive manner. Each embodiment focuses on the differences from other embodiments, and the same or similar parts between the embodiments can be referred to each other. For the device disclosed herein, since it corresponds to the method disclosed in the embodiments, its description is relatively simple, and the relevant part can refer to the description of the method.

Furthermore, it should also be noted that the terms "first" and "second" are only intended to distinguish one entity or operation from another entity or operation, and do not necessarily require or imply that there is any such actual relationship or sequence between these entities or operations. Moreover, the terms "comprise", "include" or any other variants are intended to indicate non-exclusive inclusion so that the process, method, article, or equipment referred to only includes the listed elements but also includes other elements that are not explicitly listed, or includes the inherent elements. If there are no more restrictions, the elements defined by "including a . . . " do not exclude the existence of other identical elements in the process, method, article, or equipment that includes the element.

The above-mentioned description of the disclosed embodiments is intended to enable those skilled in the art to implement or use the present invention, and should not be considered to limit the disclosure. Various modifications, variations and improvements made by those skilled in the art without departing from the spirit of the disclosure shall fall within the scope of the disclosure defined by the appended claims.

What is claimed is:

1. A powder-based three-dimensional printing (3DP) method, comprising:
    analyzing print images of individual layers corresponding to a part to be printed to determine a target print image; and adding a preset mark to the target print image; wherein the target print image comprises a print image of a target layer which causes a previous layer of powder to be pushed and displaced during printing;
    acquiring an image to be printed of a current layer to be printed; and
    identifying the image to be printed to determine whether the preset mark exists on the image to be printed; and if the preset mark exists on the image to be printed, processing the current layer to be printed and/or a previous layer of powder of the current layer to be printed such that the previous layer of powder of the current layer to be printed does not move along with powder spreading of the current layer to be printed.

2. The powder-based 3DP method of claim 1, wherein the step of "analyzing print images of individual layers corresponding to a part to be printed to determine a target print image; and adding a preset mark to the target print image" is performed through steps of:
    performing difference-product processing on spraying areas of a binder in print images of adjacent two layers in the layers corresponding to the part to be printed;
    calculating a difference-product image area between a spraying area of the binder in a print image of an $(n+1)^{th}$ layer and a spraying area of the binder in a print image of an $n^{th}$ layer, wherein n=1, 2, 3 . . . N, and N is the total number of print images; and
    determining whether the difference-product image area is greater than a preset value; if yes, taking the print image of the $(n+1)^{th}$ layer as the target print image, and adding the preset mark to the print image of the $(n+1)^{th}$ layer.

3. The powder-based 3DP method of claim 1, wherein the step of "processing the current layer to be printed and/or a previous layer of powder of the current layer to be printed" is performed through steps of:
    reducing a spreading speed of a powder spreader on the current layer to be printed; and/or
    solidifying the previous layer of powder of the current layer to be printed.

4. The powder-based 3DP method of claim 1, wherein the step of "processing the current layer to be printed and/or a previous layer of powder of the current layer to be printed" is performed through steps of:
    controlling a powder spreader to pause for a preset time period, and subsequently spreading powder on the current layer to be printed; and/or
    solidifying the pervious layer powder of the current layer to be printed.

5. The powder-based 3DP method of claim 3, wherein the step of "solidifying the previous layer of powder of the current layer to be printed" is performed through a step of:
    adding a catalyst to the previous layer of powder of the current layer to be printed to solidify the previous layer of powder.

6. The powder-based 3DP method of claim 4, wherein the step of "solidifying the previous layer of powder of the current layer to be printed" is performed through a step of:
    adding a catalyst to the previous layer of powder of the current layer to be printed to solidify the previous layer of powder.

7. A powder-based 3DP device, comprising:
    an adding module;
    an acquisition module;
    a recognition module; and
    a processing module;
    wherein the adding module is configured to analyze print images of individual layers corresponding to a part to be printed to determine a target print image and add a preset mark to the target print image; and the target print image comprises a print image of a target layer, which causes a previous layer of powder to be pushed and displaced during printing;
    the acquisition module is configured to acquire an image to be printed of a current layer to be printed;
    the recognition module is configured to identify the image to be printed to determine whether the preset mark exists on the image to be printed, and trigger the processing module if the preset mark exists on the image to be printed; and
    the processing module is configured to process the current layer to be printed and/or a previous layer of powder of the current layer to be printed such that the previous layer of powder does not move along with powder spreading of the current layer to be printed.

8. The powder-based 3DP device of claim 7, wherein the adding module comprises:
    a processing unit;
    a judgment unit; and
    an adding unit;
    wherein the processing unit is configured to perform difference-product processing on spraying areas of a binder in print images of adjacent two layers in the layers corresponding to the part to be printed, and calculate a difference-product image area between a spraying area of the binder in a print image of an $(n+1)^{th}$ layer and a spraying area of the binder in a print image of an $n^{th}$ layer, wherein n=1, 2, 3 . . . N, and N is the total number of print images; and
    the judgment unit is configured to determine whether the difference-product image area is greater than a preset value, and trigger the adding unit if the difference-product image area is greater than the preset value; and
    the adding unit is configured to take the print image of the $(n+1)^{th}$ layer as the target print image and add the preset mark to the print image of the $(n+1)^{th}$ layer.

9. The powder-based 3DP device of claim 7, wherein the processing unit comprises:
    a pause unit configured to control a powder spreader to pause for a preset time period and subsequently spread powder on the current layer to be printed; and/or
    a solidifying unit configured to solidify the previous layer of powder of the current layer to be printed.

10. A powder-based 3DP system, comprising:
    a memory configured to store a computer program; and a processor configured to execute the computer program to implement the powder-based 3DP method of claim 1.

11. A computer-readable storage medium, wherein the computer-readable storage medium stores a computer program; and the computer program is executed by a processor to implement the powder-based 3DP method of claim 1.

* * * * *